United States Patent [19]

Sakuma

[11] Patent Number: 4,913,256

[45] Date of Patent: Apr. 3, 1990

[54] MOTORCYCLE

[75] Inventor: Tsutomu Sakuma, Saitama, Japan

[73] Assignee: Honda Giken Kogyo Kabushiki Kaisha, Tokyo, Japan

[21] Appl. No.: 55,463

[22] Filed: May 29, 1987

[30] Foreign Application Priority Data

May 30, 1986 [JP] Japan .................................. 61-124775
Jun. 25, 1986 [JP] Japan .............................. 61-97069[U]

[51] Int. Cl.⁴ ............................................ B60K 11/04
[52] U.S. Cl. .................................... 180/229; 180/68.1
[58] Field of Search ............. 180/219, 225, 229, 68.1, 180/68.2, 68.3, 221, 223, 226, 227; 296/78.1, 208

[56] References Cited

U.S. PATENT DOCUMENTS

| | | | |
|---|---|---|---|
| 4,519,473 | 5/1985 | Ochiqi et al. | 180/229 |
| 4,570,740 | 2/1986 | Hara | 180/229 |
| 4,577,720 | 3/1986 | Hamane et al. | 180/229 |
| 4,678,223 | 7/1987 | Nishi et al. | 180/68.1 |
| 4,697,664 | 10/1987 | Koyama | 180/227 |

FOREIGN PATENT DOCUMENTS 2532892 3/1984 France.
60-45284 3/1985 Japan.
60-67280 4/1985 Japan.

*Primary Examiner*—Charles A. Marmor
*Assistant Examiner*—Richard Camby
*Attorney, Agent, or Firm*—Irving M. Weiner; Joseph P. Carrier; Pamela S. Burt

[57] ABSTRACT

A motorcycle includes a substantially longitudinal frame, front and rear wheels rotatably supported on the frame, an engine mounted on the frame between the front and rear wheels, a rear fork supporting the rear wheel and vertically swingably mounted on a rear end of the frame, a rear fender disposed in the vicinity of an upper portion of the rear wheel and covering the upper portion of the rear wheel, and a fairing device having a ram air inlet port defined in a front portion thereof and extending from a position in front of the frame in covering relation to the engine toward a position above the rear wheel where the fairing device covers the rear fender in surrounding relation thereto. The fairing device cooperates with the rear fender in providing a discharge duct defining a discharge air passage therein and having an air discharge port defined in an open end portion thereof. The motorcycle also has a radiator disposed forwardly of the engine, a fuel tank disposed upwardly of the engine, and a rider's seat disposed rearwardly of the fuel tank, the fairing device comprising a fairing extending from the position in front of the frame and covering the engine entirely, and a side cover covering opposite sides below the seat and an area above the rear wheel. The fairing has an outlet port having a front edge positioned behind the radiator and a rear edge positioned above the engine.

11 Claims, 10 Drawing Sheets

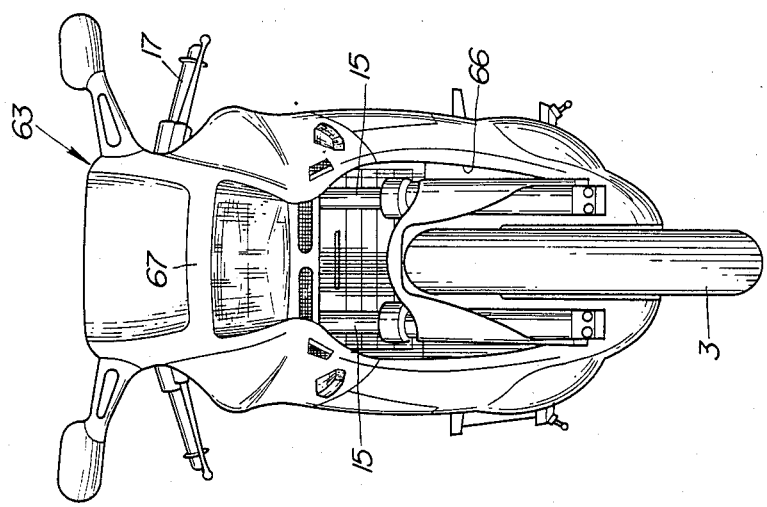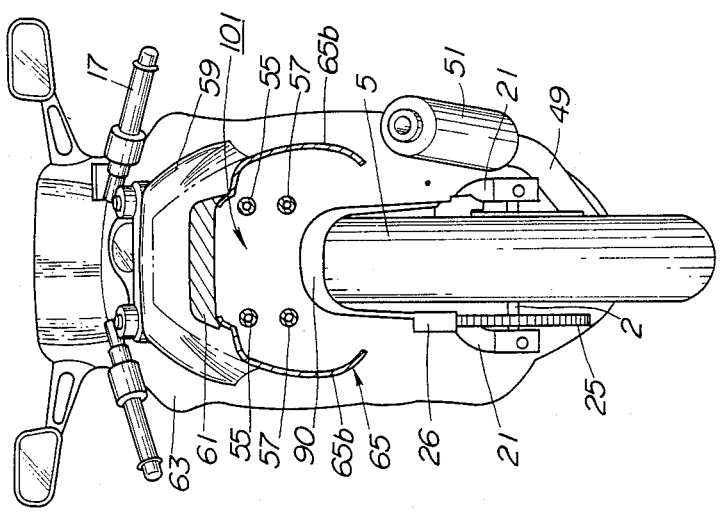

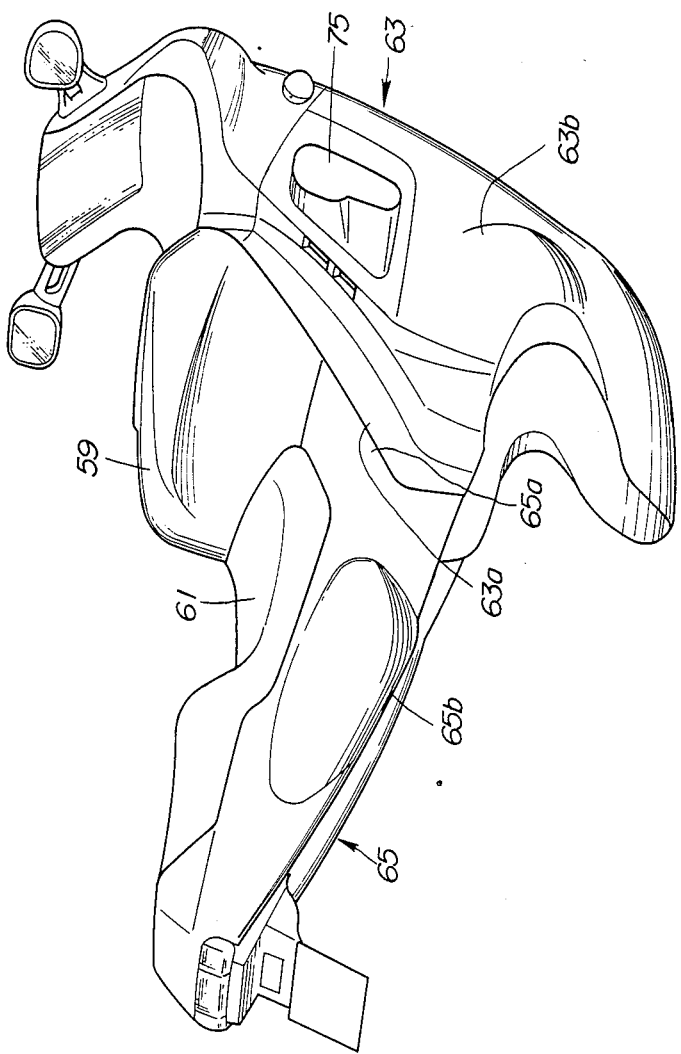

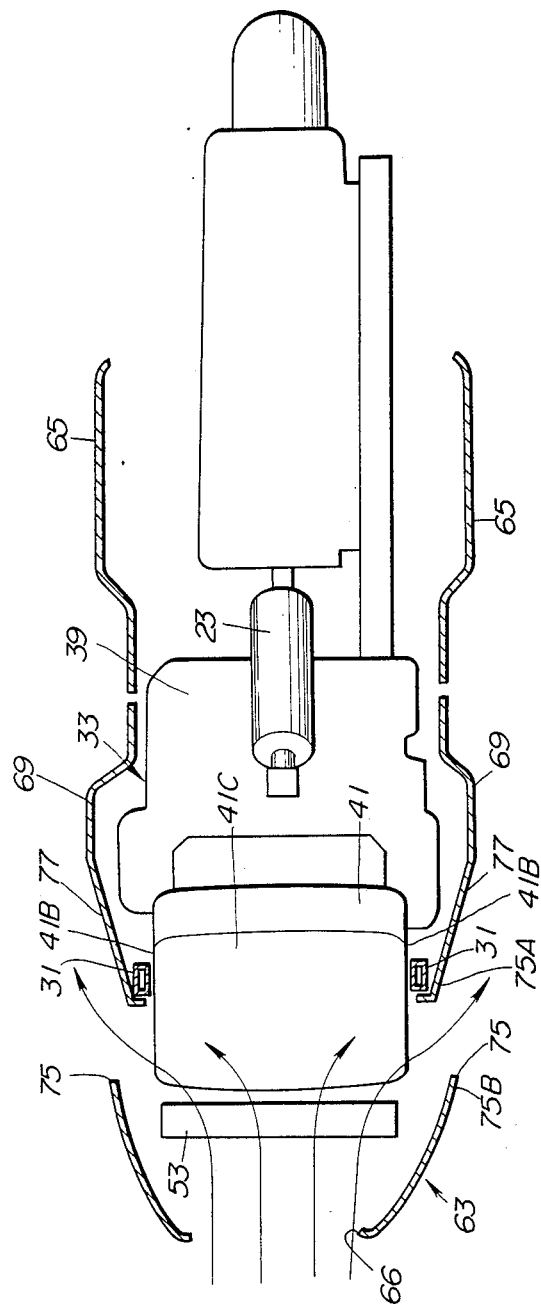

MOTORCYCLE

BACKGROUND OF THE INVENTION

1. Field of the Invention:

The present invention relates to a motorcycle and more particularly to a motorcycle having a fairing device designed for efficiently cooling an engine and associated components.

2. Description of the Relevant Art:

Known road-going sporting motorcycles have a fairing device covering the opposite sides of a front motorcycle area from a position in front of the instrument panel to the engine located between front and rear wheels for reducing air resistance and lift while running at high speed. One such a motorcycle is disclosed in Japanese Utility Model application No. 60-45284, for example.

The disclosed motorcycle has a radiator and an engine positioned between front and rear wheels, the radiator being located in front of the engine. The motorcycle also has a fuel tank disposed above the engine and a rider's seat or saddle positioned behind the fuel tank. The fairing device of the motorcycle comprises a front fairing covering the radiator and the engine, and a seat fairing or side cover covering an area behind the seat and opposite sides below the seat.

The motorcycle also includes an air passage duct disposed longitudinally in the motorcycle body. The air passage duct has an inlet port positioned in a space between the fuel tank and the engine closely to a rear portion of the radiator and is branched into two lateral members having outlet ports opening as nozzles on the opposite sides of the seat fairing positioned rearwardly of the legs of the rider.

Air flowing from behind the radiator is guided through the air passage duct and smoothly discharged therefrom on the opposite sides of the seat fairing without impinging upon the engine and related components. Therefore, air resistance arising from the air flow from behind the radiator is reduced. The seat fairing behind the seat is narrower than the rider, forming steps between itself and the seat. Air discharged from the outlet ports acts on and stabilizes ram air flowing along the fairing device. Therefore, air resistance can be lowered while keeping a preferred sheet fairing configuration.

Since, however, the air passage duct is accommodated in the fairing device or the motorcycle body, it is subject to space limitations imposed by other components. The air passage duct serves primarily to cool the radiator, and, for this purpose, has a flange-shaped guide disposed on the inlet port in covering relation to the entire rear surface of the radiator. Therefore, no sufficient ram air is supplied to the cylinder portion of the engine which is positioned behind or below the flange-shaped guide.

Japanese Laid-Open Patent Publication No. 60-67280, for example, discloses a motorcycle fairing device which does not have an air passage duct that would be subject to the aforesaid space limitations.

More specifically, the disclosed fairing device is mounted on a motorcycle having an engine positioned between front and rear wheels and having cylinders projecting upwardly from a crankcase and inclined forwardly, a frame having an engine hanger supporting the engine, and a radiator disposed in front of the engine. The fairing device includes a fairing that covers an area from a front frame portion to the opposite sides of the engine, a ram air inlet port defined in a front surface of the fairing, and outlet ports defined in respective side surfaces of the fairing, each of the outlet ports having a rear edge displaced inwardly of the front edge thereof in the transverse direction of the motorcycle.

It is desirable that after the radiator and the engine have been cooled by ram air, the ram air be immediately discharged out of the fairing device for increased engine cooling efficiency. However, inasmuch as the engine cylinder portion is positioned behind the outlet ports and no air passage duct or air guide for guiding ram air to the outlet ports is provided in the arrangement disclosed in Japanese Laid-Open Patent Publication No. 60-67280, the ram air that has cooled the engine cylinders cannot immediately be discharged out of the fairing but tends to remain in the fairing. As a result, the engine cooling efficiency cannot be increased. The tendency for cooling air to remain undischarged is greater with a full fairing or full cover type in which the fairing is joined to other motorcycle members such as side covers disposed above the rear wheel and on opposite sides beneath the rider's seat.

SUMMARY OF THE INVENTION

In view of the aforesaid problems of the conventional motorcycle fairing devices, it is an object of the present invention to provide a motorcycle having a fairing device which is capable of efficiently utilizing ram air introduced from a ram air inlet port to cool an engine and other associated members such as an exhaust pipe, and of discharging the ram air that has cooled the engine from outlet ports with high efficiency.

A motorcycle according to the present invention includes a substantially longitudinal frame, front and rear wheels rotatably supported on the frame, an engine mounted on the frame between the front and rear wheels, a rear fork supporting the rear wheel and vertically swingably mounted on a rear end of the frame, a rear fender disposed in the vicinity of an upper portion of the rear wheel and covering the upper portion of the rear wheel, and a fairing device having a ram air inlet port defined in a front portion thereof and extending from a position in front of the frame in covering relation to the engine toward a position above the rear wheel where the fairing device covers the rear fender in surrounding relation thereto, the fairing device cooperating with the rear fender in providing a discharge duct defining a discharge air passage therein and having an air discharge port defined in an open end portion thereof.

The motorcycle also has a radiator disposed forwardly of the engine, a fuel tank disposed upwardly of the engine, and a rider's seat disposed rearwardly of the fuel tank, the fairing device comprising a fairing extending from the position in front of the frame and covering the engine entirely, and a side cover covering opposite sides below the seat and an area above the rear wheel.

The engine has a crankcase, a cylinder assembly extending obliquely forwardly from a front portion of the crankcase and having an upper surface inclined rearwardly, and an engine associated mechanism disposed obliquely rearwardly of the cylinder assembly, the frame having a pair of engine hangers comprising extensions depending from a front portion of the frame. The engine hangers extend downwardly closely and along sides of the cylinder assembly and have lower ends to which the engine is coupled. The fairing has an outlet port having a front edge positioned behind the radiator and a rear edge positioned at the extensions of the engine hangers.

The above and further objects, details and advantages of the present invention will become apparent from the following detailed description of preferred embodiments thereof, when read in conjunction with the accompanying drawings.

BRIEF DESCRIPTION OF THE DRAWINGS

FIG. 3 is a cross-sectional view taken along line III—III of FIG. 1;

FIG. 4 is a perspective view of a fuel tank, a fairing, and a side cover, as assembled together, of the motorcycle according to the first embodiment;

FIG. 7 is a front elevational view of the motorcycle of FIG. 5;

FIG. 11 is a cross-sectional view taken along line XI—XI of FIG. 5;

DETAILED DESCRIPTION OF THE PREFERRED EMBODIMENTS

Figure 1:
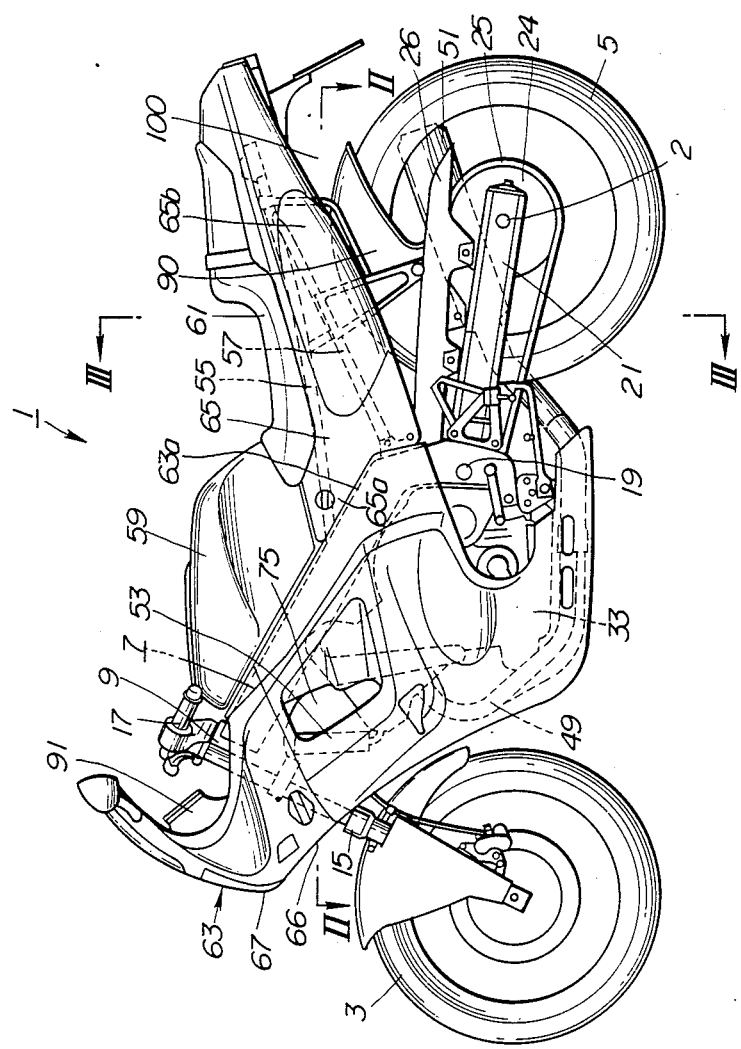
FIG. 1 is a side elevational view of a motorcycle according to a first embodiment of the present invention.

Like or corresponding parts are denoted by like or corresponding reference numerals throughout several views.

A first embodiment of the present invention will be described in detail with reference to FIGS. 1 through 4.

FIG. 1 shows a motorcycle 1 according to the first embodiment of the invention.

The motorcycle 1 includes a frame 7 with a head pipe 9 fixed to the front end thereof. A handlebar 17 is angularly movably supported on the head pipe 9 and coupled to a front fork 15 on which a front wheel 3 is rotatably supported. A rear fork 21 on which a rear wheel 5 is rotatably supported is vertically swingably supported on a support shaft 19 mounted transversely on a rear portion of the frame 7.

Seat rails 55 extend rearwardly from a substantially longitudinally intermediate portion of the frame 7 slightly obliquely upwardly toward a position above the rear wheel 5. The rear ends of the seat rails 55 are coupled to the rear ends of rear stays 57 extending rearwardly from the rear end of the frame 7 more obliquely upwardly than the seat rails 55.

A fuel tank 59 is mounted on an upper surface of the frame 7 and front upper surfaces of the seat rails 55. A rider's seat or saddle 61 is disposed on and astride of the seat rails 55 rearwardly of the fuel tank 59.

An engine 33 and a radiator 53 positioned in front of the engine 33 are installed in a lower portion of the frame 7 between the front wheel 3 and the rear wheel 5. The engine 33 has an exhaust pipe 49 extending from a front portion thereof obliquely downwardly and then below the engine toward the rear wheel 5 where the exhaust pipe 49 is coupled to a muffler 51 located on the righthand side of the rear wheel 5.

The rear wheel 5 is rotatably supported by a rear axle 2 on the rear fork 21. A driven sprocket 24 is fitted over the lefthand end portion of the rear axle 2. The rear wheel 5 can be driven by a drive chain 25 trained around the driven sprocket 24 and a driver sprocket (not shown) connected to the crankshaft of the engine 33.

The drive chain 25 has its upper portion covered with a chain case 26 fixed to the rear fork 21, the chain case 26 being integral with or tightly united with a rear fender 90 disposed closely to the rear wheel 5 in covering relation to an upper portion and both side portions of the rear wheel 5.

The motorcycle 1 of the present invention has a fairing device including a fairing 63 covering a front half portion of the motorcycle and a side cover 65 covering opposite side areas below the seat 61 which covers a rear half portion of the motorcycle.

The fairing 63 extends from a position in front of an instrument panel 91 positioned forwardly of the handlebar 17 over opposite sides of the engine 33 toward a position below the exhaust pipe 49. The fairing 63 includes upper rear edges 63a covering a rear portion of the frame 7 and joined respectively to front edges 65a of the side cover 65 which covers the upper portion of the rear wheel 5 on the opposite side areas below the seat 61.

Figure 2:
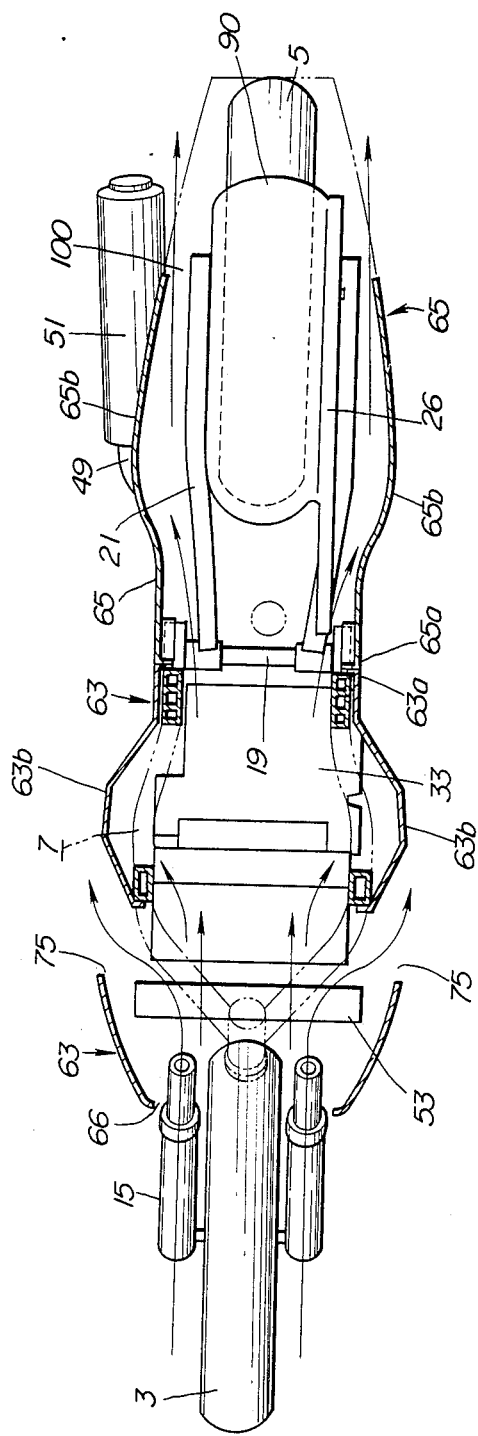
FIG. 2 is a cross-sectional view taken along line II—II of FIG. 1.

As shown in FIG. 2, the front and rear edges 63a, 65a have their ends curved inwardly and held in abutment against each other such that their outer surfaces lie flush with each other.

The fairing 63 has a ram air inlet port 66 defined in a front panel 67 thereof for introducing ram air into the fairing 63. The fairing 63 has ram air outlet ports 75 defined in opposite rear side panels thereof for discharging, as smooth air streams, part of the ram air introduced through the ram air inlet port 66, as shown in FIGS. 2 and 4. The fairing 63 also has a pair of opposite bulging portions 63b projecting laterally outwardly and covering the opposite lateral sides of the engine 33.

As illustrated in FIG. 3, the side cover 65 has a pair of opposite bulging portions 65b surrounding the upper portion of the rear fender 90 in widely spaced apart relation thereto.

The bulging portions 65b of the side cover 65, the rear fender 90, and the lower surface of the seat 61 jointly constitute an air discharge duct defining an air discharge passage 101, as shown in FIG. 3. The air discharge duct has an open rear end serving as an air discharge port 100 (FIGS. 1 and 2). The space around the air discharge port 100 allows the rear fender 90 and the rear wheel 5 to swing together vertically therein. The air discharge port 100 has a large vertical dimension since the rear fender 90 is disposed closely to the rear wheel 5.

As illustrated in FIG. 2, the motorcycle 1 has a reduced width where the fairing 63 and the side cover 65 are joined and also has progressively increased widths at the bulging portions 63b of the fairing 63 and the bulging portions 65b of the side cover 65, the bulging portions 63b, 65b being located forwardly and rearwardly of the reduced-width portion.

As described above, the fairing 63 and the side cover 65 jointly constitute the fairing device of a full fairing design which substantially fully covers the motorcycle frame. The front portion of the fairing 63 has the ram air inlet port 66, and at least the bulging portions 65b of the side cover 65 and the rear fender 90 jointly define the air discharge passage 101 with its rear open end serving as the air discharge port 100. While the motorcycle 1 is running, ram air is introduced through the ram air inlet port 66, and, after having cooled the radiator 54, the engine 33, and the exhaust pipe 49, passes through the air discharge passage 101 and is discharged from the air discharge port 100. The engine 33 and the other components which are heated to high temperature can be cooled highly efficiently by the ram air flowing through the fairing device. The engine 33 is therefore prevented from malfunctioning due to heat, and enables the motorcycle 1 to have sufficient running performance.

Since the width of the fairing device is smaller in the area where the fairing 63 and the side cover 65 are joined and larger at the bulging portions 63b, 65b in front of and behind the joined area, the joined area exhibits a venturi tube effect by which the air pressure in the joined area is low and the speed of air flow in the joined area is high. The high speed of air flow through the joined area of the fairing device reduces resistance to air flow and increases the cooling efficiency of the engine 33 and the exhaust pipe 49.

A motorcycle according to a second embodiment of the present invention will be described with reference to FIGS. 5 through 14.

The motorcycle, denoted at 1, has a frame 7 comprising a head pipe 9, a pair of lateral main pipes 11 extending rearwardly from the head pipe 9, and a pair of lateral joint plates 13 depending from the rear ends of the main pipes 11.

A front wheel 3 is steerably supported on the frame 7 by a pair of laterally spaced front fork members 15 coupled to the head pipe 9 and a handlebar 17.

A rear fork 21 is connected to the joint plates 13 by a pivot shaft 19. A rear wheel 5 is rotatably supported on the rear end of the rear fork 21. The rear wheel 5 is suspended by a damper 23 and a link mechanism 25 coupled between the frame 7 and the rear fork 21.

Figure 9:
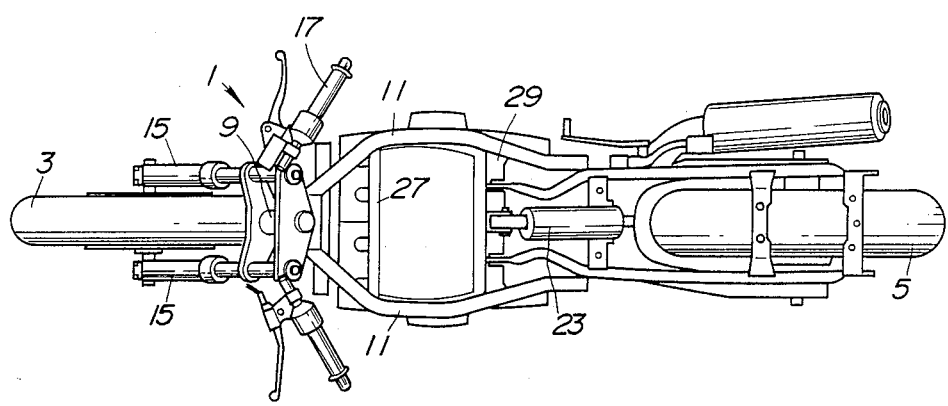
FIG. 9 is a plan view of the motorcycle illustrated in FIG. 8.
Figure 10:
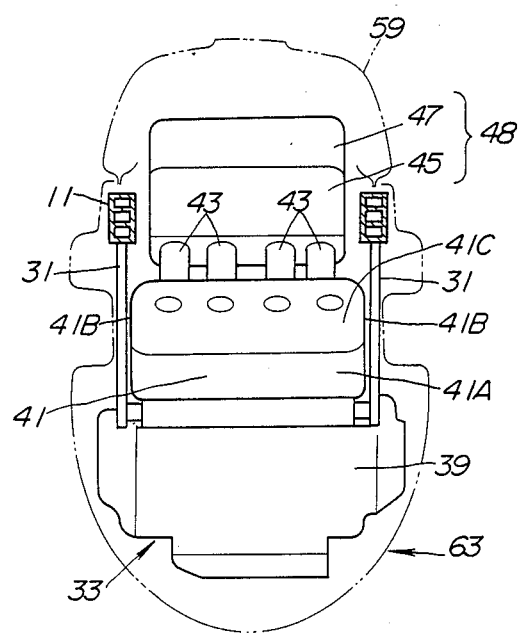
FIG. 10 is a cross-sectional view taken along line X—X of FIG. 5.

As shown in FIG. 10, each of the main pipes 11 is in the form of a tubular member of rectangular cross section with two parallel spaced reinforcing plates disposed therein. The main pipes 11 are reinforced by being interconnected by cross pipes 27, 29 joined to longitudinally intermediate portions of the main pipes 11, as shown in FIG. 9. Engine hangers 31 depending respectively from front portions of the main pipes 11 comprise extensions by which an engine 33 is hung.

The engine 33 is a four-cycle engine, for example, which is supported on a support shaft 37 coupled to the engine hangers 31 and a support shaft 35 coupled to the joint plates 13.

As illustrated in FIG. 10, the engine 33 has a cylinder assembly 41 having four cylinders projecting obliquely forwardly from a front portion of a crankcase 39, the cylinders being laterally arranged. As shown in FIGS. 10 and 11, the engine hangers 31 are disposed closely to opposite sides 41B of an upper portion 41A of the cylinder assembly 41.

The upper portion 41A of the cylinder assembly 41 has a cylinder head having an upper surface 41C inclined rearwardly and defining a valve operating chamber therein. Air intake pipes 43 project from a rear portion of the cylinder head and are connected at rear ends thereof to a carburetor 45 connected to an air cleaner 47 positioned rearwardly and obliquely upwardly of the cylinder assembly 41. The rearwardly inclined upper surface 41C of the cylinder head and a front surface of an intake assembly 48 comprising the air cleaner 47 and the carburetor 45 and serving as an engine associated mechanism are used as guide surfaces for guiding ram air.

An exhaust pipe 49 coupled to the engine 33 extends forwardly and obliquely downwardly from a front portion of the cylinder assembly 41 and then rearwardly along front and lower portions of the crankcase 39. The exhaust pipe 49 has a rear end joined to a muffler 51.

A radiator 53 is disposed substantially vertically between the front ends of the main pipes and the lower end of the rearwardly inclined upper surface 41C and positioned in front of the upper surface 41C.

Seat rails 55 extend rearwardly from rear portions of the main pipes 11. The rear ends of the seat rails 55 and upper portions of the joint plates 13 are coupled to each other by rear stays 57.

A fuel tank 59 is disposed on and astride of the main pipes 11 in covering relation to the air cleaner 47. A rider's seat or saddle 61 is mounted on the seat rails 55.

Front and side portions of the frame 7 are covered with a fairing 63 and a side cover 65.

Figure 12:
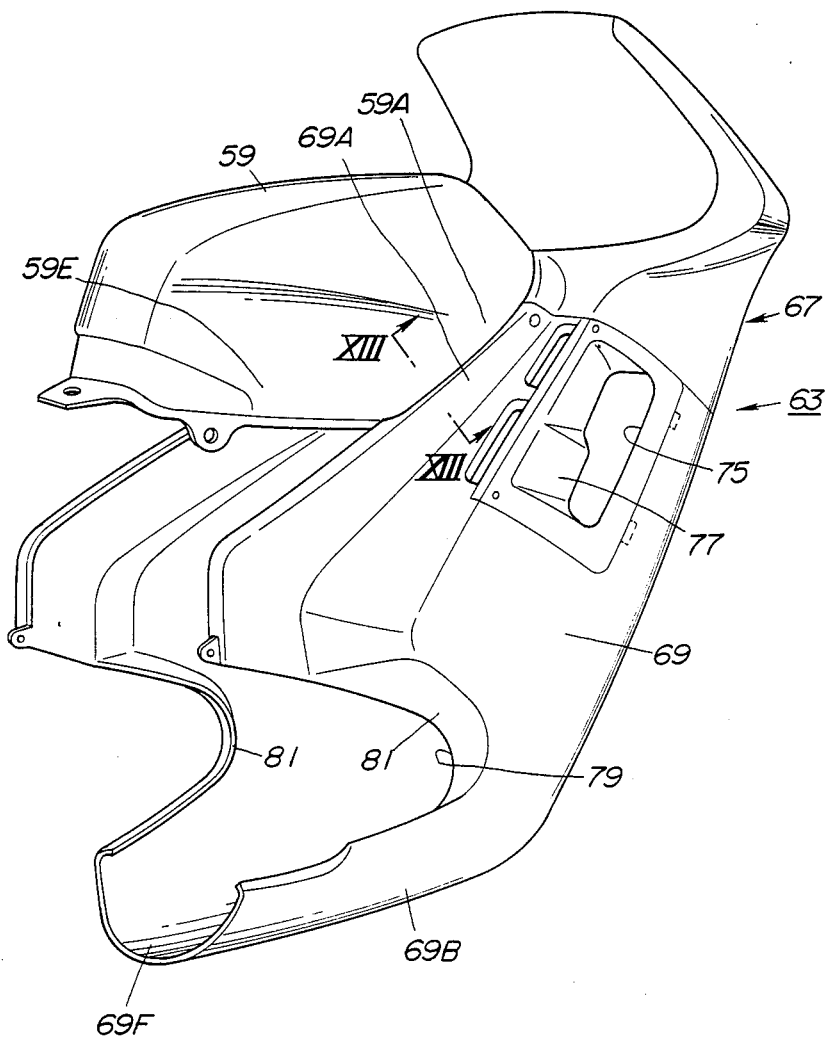
FIG. 12 is a perspective view of a fuel tank, a fairing, and a side cover, as assembled together, of the motorcycle according to the second embodiment.

The fairing 63 has a front panel 67 with a ram air inlet port 66 defined therein, a pair of laterally opposite side panels 69 contiguous to the front panel 67 and covering the main pipes 11 and opposite sides of the engine 33, and a bottom panel 69B contiguous to the side panels 69 and covering a lower surface of the engine 33, as shown in FIG. 12.

Figure 13:
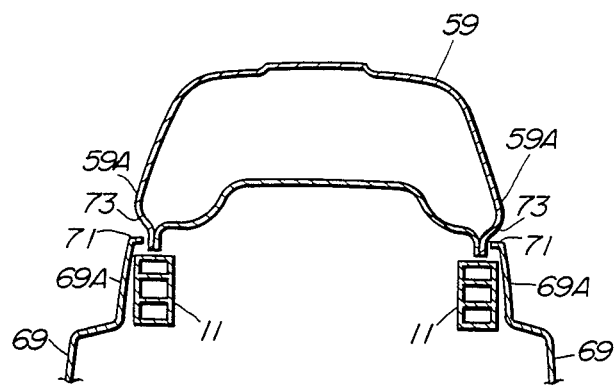
FIG. 13 is a cross-sectional view taken along line XIII—XIII of FIG. 12.

As shown in FIG. 13, the side panels 69 have upper edges 69A including bent members 71 directed transversely inwardly toward lower edges 59A of the fuel tank 59 which have recesses 73 in which the bent members 71 are positioned. Thus, the lower edges 59A of the fuel tank 59 and the upper edges 69A of the fairing side panels 69 are substantially continuously aligned with each other so that they lie substantially flush with each other. The fairing side panels 69 have ram air outlet ports 75 defined therein laterally of the cylinder assembly 41.

As shown in FIG. 11, the ram air outlet ports 75 have rear edges 75A displaced transversely inwardly of the front edges 75B thereof. From the rear edges 75A, there extend rearwardly slanted surfaces 77 which are gradually spread transversely outwardly.

Figure 14:
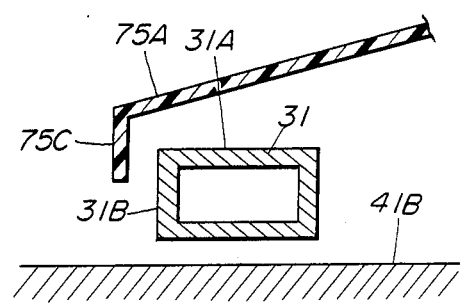
FIG. 14 is a fragmentary cross-sectional view of an engine hanger and members around an outlet port.

As illustrated in FIG. 14, each of the rear edges 75A is disposed near a side surface 31A of one of the engine hangers 31, and has a bent member 75C bent transversely inwardly in front of a front edge 31B of the engine hanger 31.

The fairing 63 has a recess 79 defined in a rear and lower portion thereof and having on its edges ridges 81 projecting toward the crankcase 39, as shown in FIG. 12.

The side cover 65 lies continuously between rear portions 69E of the fairing side panels 69, side rear ends 59E of the fuel tank 59, and lower edges 61E of the rider's seat 61.

Figure 5:
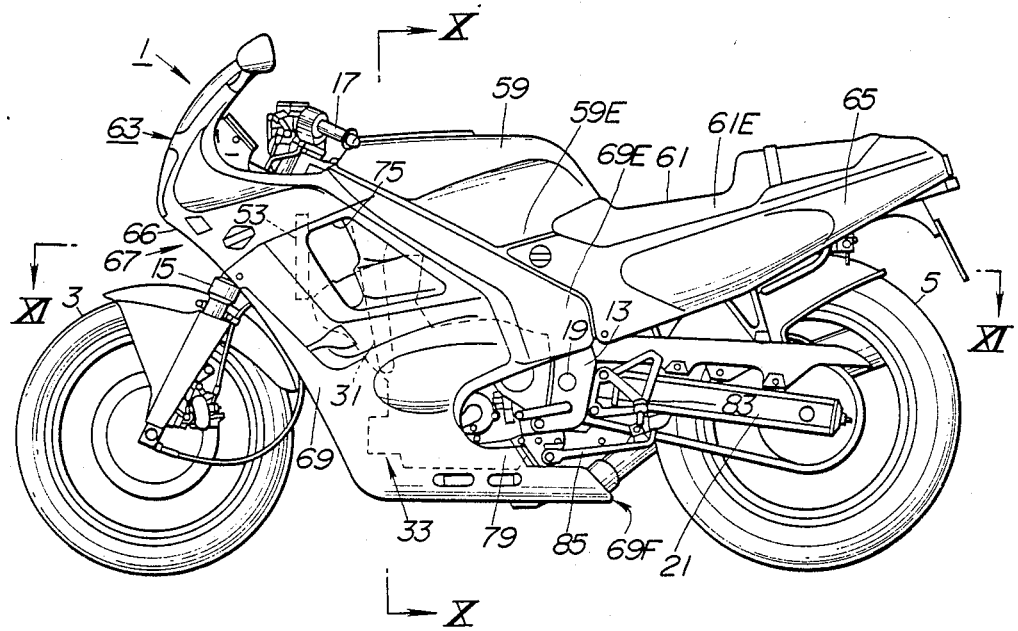
FIG. 5 is a side elevational view of a motorcycle according to a second embodiment of the present invention.
Figure 6:
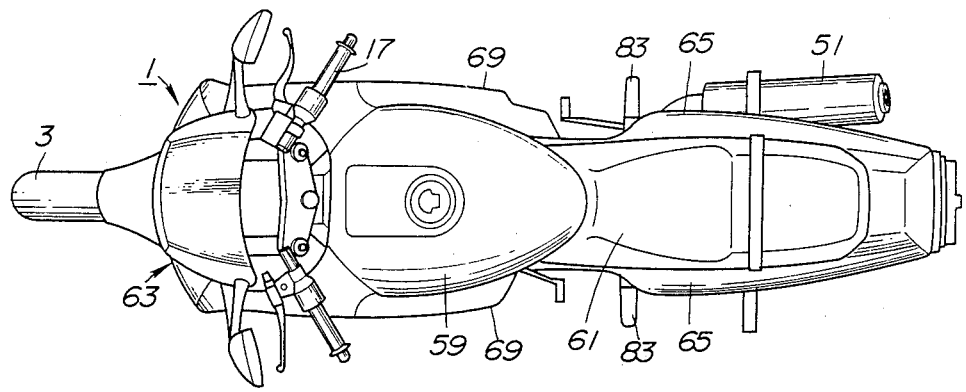
FIG. 6 is a plan view of the motorcycle shown in FIG. 5.
Figure 8:
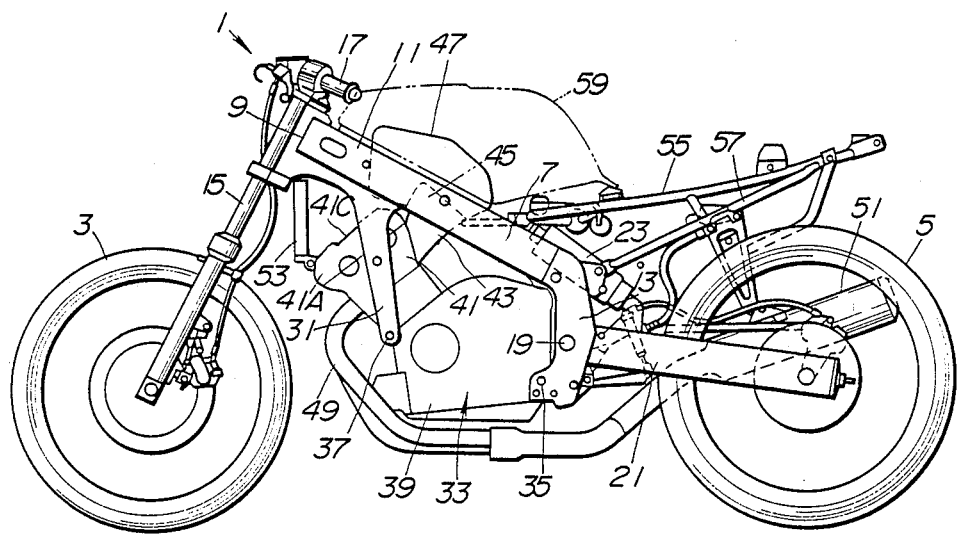
FIG. 8 is a side elevational view of the motorcycle of FIG. 5, with a fairing and a side cover omitted from illustration.

As shown in FIGS. 5 and 6, the motorcycle 1 has a pair of lateral footsteps 83 and a stand 85.

The fairing device of the motorcycle 1 according to the second embodiment is of a full fairing configuration which has its fairing 63 continuously joined to the side cover 65 and other frame-mounted components. Ram air drawn from the ram air inlet port 66 first cools the radiator 53 and then the cylinder assembly 41, while the ram air impinges upon the rearwardly inclined upper surface 41C serving as a guide surface and the intake assembly 48 comprising the carburetor 45 and the air cleaner 47 and serving as an engine associated mechanism providing another guide surface. The ram air is guided by these guide surfaces toward the air outlet ports 75 from which the air is efficiently discharged.

Each engine hanger 31 is employed as a closure member which closes the gap between the side 41B of the cylinder assembly 41 and the rear edge 75A of the air outlet port 75, as shown in FIG. 14, so that the ram air can be discharged from the air outlet port 75 very efficiently.

The ram air introduced from the ram air inlet port 66 and flowing through a region below the air outlet ports 75 cools the engine 33, and is thereafter guided by the rear end 69E of the fairing 69 and the side cover 65 so as to be discharged from the rear end of the fairing device. The ram air that has cooled a lower portion of the crankcase 39 is discharged rearwardly from a lower rear end 69F of the fairing 69 below the footsteps 83.

A rear fender may be provided which is vertically swingable with the rear wheel 5 and located near an upper portion of the rear wheel 5 in covering relation thereto, as with the first embodiment. The rear fender cooperates with a lower rear portion of the side cover 65 in defining an air discharge port. The air outlet ports of the first embodiment may be defined in the same manner as those of the second embodiment. In particular, in order to substantially cover an upper half portion of the rear wheel 5 by the rear fender 90, the rear fender 90 is desired to have an upper fender portion covering the upper portion of the rear wheel 5, a side fender portion tightly united with and upwardly extending from the chain covering case 26 in covering relation to the corresponding side portion of the rear wheel 5 and an opposite side fender portion tightly united with and upwardly extending from the corresponding rear fork 21 in covering relation to the corresponding side portion of the rear wheel 5 as shown in FIG. 3.

With the arrangement of the present invention, ram air introduced from the air inlet port 66 into the fairing device comprising the fairing 63 and the side cover 65 can efficiently be discharged from the air outlet ports 75 and the air discharge port 100. Thus the fairing device of the full fairing design can increase the cooling efficiency of the engine and other components.

Although there have been described what are at present considered to be the preferred embodiments of the present invention, it will be understood that the invention may be embodied in other specific forms without departing from the spirit or essential characteristics thereof. The present embodiments are therefore to be considered in all aspects as illustrative, and not restrictive. The scope of the invention is indicated by the appended claims rather than by the foregoing description.

I claim:

1. A motorcycle comprising:
   a substantially longitudinal frame having at least a head pipe, a main pipe extending rearwardly from the head pipe, and a joint plate depending from the rear end of the main pipe;
   front and rear wheels rotatably supported on said frame;
   a rear fork supporting said rear wheel and vertically swingably mounted on said joint plate by a pivot shaft;
   a rider's seat disposed near the rear wheel;
   an engine mounted on said frame under said main pipe and disposed forwardly of said rider's seat and said joint plate;
   a rear fender disposed in a the vicinity of an upper portion and, opposite side portions of said rear wheel and covering said portions of the rear wheel; and
   a fairing device having a ram air inlet portion defined between said head pipe and said front wheel and extending from a position in front of said head pipe in covering relation to said engine toward a position above the rear wheel where the fairing device covers said rear fender in surrounding relation thereto, said fairing device cooperating with said rear fender in providing a discharge duct therebetween, said discharge duct defining a discharge air passage therein and having an air discharge port defined in a rear open end portion thereof.

2. A motorcycle according to claim 1, further including:
   a radiator disposed forwardly of said engine;
   a fuel tank disposed upwardly of said engine; and
   a rider's seat disposed rearwardly of said fuel tank;
   said fairing device comprising a fairing extending from the position in front of said head pipe and covering said engine entirely, and a side cover covering opposite sides below said seat and an area above said rear wheel.

3. A motorcycle comprising:
   a substantially longitudinal frame;
   front and rear wheels rotatably supported on said frame;
   an engine mounted on said frame between said front and rear wheels;
   a rear fork supporting said rear wheel and vertically swingably mounted on a rear end of said frame;
   a rear fender disposed in the vicinity of an upper portion and opposite side portions of said rear wheel and covering said portions of the rear wheel;
   a radiator disposed forwardly of said engine;
   a fuel tank disposed upwardly of said engine;
   a rider's seat disposed rearwardly of said fuel tank; and
   a fairing device having a ram air inlet port defined in a front portion thereof and extending from a position in front of said frame in covering relation to said engine toward a position above the rear wheel where the fairing device covers said rear fender in surrounding relation thereto, said fairing device cooperating with said rear fender in providing a discharge duct defining a discharge air passage therein and having an air discharge port defined in an open end portion thereof;
   said fairing device comprising a fairing extending from the position in front of said frame and covering said engine entirely, and a side cover covering opposite sides below said seat and an area above said rear wheel; and said fairing has ram air outlet ports defined in opposite sides thereof behind said radiator and bulging portions positioned rearwardly of the ram air outlet ports and projecting outwardly on opposite sides of said engine, said side cover having bulging portions projecting outwardly on opposite sides thereof above said rear fender, said fairing and said side cover being smoothly coupled at rear and front ends, respectively, thereof, at inwardly displaced recessed portions between said bulging portions of said fairing and said side cover.

4. A motorcycle according to claim 3, wherein said air discharge duct includes at least said bulging portions of said side cover.

5. A motorcycle comprising:
a substantially longitudinal frame;
front and rear wheels rotatably supported on said frame;
an engine mounted on said frame between said front and rear wheels;
a rear fork supported on said rear wheel and vertically swingably mounted on a rear end of said frame;
a rear fender disposed in the vicinity of an upper portion and opposite side portions of said rear wheel and covering said portions of the rear wheel;
a fairing device having a ram air inlet port defined in a front portion thereof and extending from a position in front of said frame in covering relation to said engine toward a position above the rear wheel where the fairing device covers said rear fender in surrounding relation thereto, said fairing device cooperating with said rear fender in providing a discharge duct defining a discharge air passage therein and having an air discharge port defined in an open end portion thereof;
power transmitting means extending longitudinally between said engine and said rear wheel for transmitting power from said engine to said rear wheel; and
a case member covering an upper portion of said power transmitting means and integral with said rear fork, said rear fender being integral with said case.

6. A motorcycle comprising:
a substantially longitudinal frame;
front and rear wheels rotatably supported on said frame;
an engine mounted on said frame between said front and rear wheels;
a rear fork supporting said rear wheel and vertically swingably mounted on a rear end of said frame;
a rear fender disposed in the vicinity of an upper portion and opposite side portions of said rear wheel and covering said portions of the rear wheel;
a radiator disposed forwardly of said engine;
a fuel tank disposed upwardly of said engine;
a rider's seat disposed rearwardly of said fuel tank; and
a fairing device having a ram air inlet port defined in a front portion thereof and extending from a position in front of said frame in covering relation to said engine toward a position above the rear wheel where the fairing device covers said rear fender in surrounding relation thereto, said fairing device cooperating with said rear fender in providing a discharge duct defining a discharge air passage therein and having an air discharge port defined in an open end portion thereof;

said fairing device comprising a fairing extending from the position in front of said frame and covering said engine entirely, and a side cover covering opposite sides below said seat and an area above said rear wheels; and said engine has a crankcase, a cylinder assembly extending obliquely forwardly from a front portion of said crankcase and having an upper surface inclined rearwardly, and an engine associated mechanism disposed obliquely rearwardly of said cylinder assembly, said frame having a pair of engine hangers comprising extensions depending from a front portion of said frame, said engine hangers extending downwardly closely and along sides of said cylinder assembly and having lower ends to which said engine is coupled, said fairing having an outlet port having a front edge positioned behind said radiator and a rear edge positioned at said extensions of the engine hangers.

7. A motorcycle according to claim 6, wherein said rear edge of said outlet port has a bent member projecting transversely inwardly at front ends of said engine hangers and a slanted surface extending rearwardly from said bent member toward said bulging portion and gradually transversely outwardly.

8. A motorcycle according to claim 5, wherein said rear fender includes a side fender portion tightly united with and upwardly extending from said case member in covering relation to the corresponding side portion of said rear wheel.

9. A motorcycle comprising:
a substantially longitudinal frame having at least a head pipe, a main pipe extending rearwardly from the head pipe, and a joint plate depending from the rear end of the main pipe;
front and rear wheels rotatably supported on said frame;
a rider's seat disposed near the rear wheel;
an engine mounted on said frame under said main pipe and disposed forwardly of said rider's seat and said joint plate;
a rear fork supporting said rear wheel and vertically swingably mounted on said joint plate by a pivot shaft;
a rear fender disposed in covering relation to an upper portion and opposite side portions of said rear wheel; and
a fairing device comprising a fairing having a ram air inlet portion defined between said head pipe and said front wheel, said fairing extending from a position in front of said head pipe to an intermediate portion of said frame and covering said engine entirely, and a side cover covering said rear fender in surrounding relation thereto whereby said side cover cooperates with said rear fender in providing a discharge duct therebetween, said discharge duct defining a discharge air passage therein and having an air discharge port defined in a rear open portion thereof, said fairing and said side cover being smoothly and continuously coupled at rear and front ends, respectively, thereof.

10. A motorcycle comprising:
a substantially longitudinal frame having a head pipe fixed to a front end thereof;

a front wheel arranged below said head pipe and rotatably supported on said frame;

a rear fork swingably mounted on a rear end of said frame and a rear wheel rotatably supported on the rear end of said fork;

an engine mounted on said frame between said front and rear wheels;

a fuel tank disposed upwardly of said engine;

a rider's seat disposed rearwardly of said fuel tank;

a rear fender disposed in the vicinity of an upper portion and opposite side portions of said rear wheel and covering said portions of the rear wheel; and a fairing device having a ram air inlet portion defined between said head pipe and said front wheel and extending from a position in front of said head pipe in covering relation to said engine toward a position above the rear wheel where said fairing device covers said rear fender in surrounding relation thereto, said fairing device cooperating with said rear fender in providing a discharge duct therebetween, said discharge duct defining a discharge air passage therein and having an air discharge port defined in a rear open end portion thereof.

11. A motorcycle according to claim 10, further including:

a radiator disposed forwardly of said engine; and said fairing device comprising a fairing extending from the position in front of said head pipe and covering said engine entirely, and a side cover covering opposite sides below said seat and an area above the rear wheel.

* * * * *

UNITED STATES PATENT AND TRADEMARK OFFICE
CERTIFICATE OF CORRECTION

PATENT NO. : 4,913,256

DATED : April 3, 1990

INVENTOR(S) : Sakuma

It is certified that error appears in the above-identified patent and that said Letters Patent is hereby corrected as shown below:

Column 8, line 15 (Claim 1, line 15), delete "a" (second occurrence).

Column 10, line 8 (Claim 6, line 30), change "wheels" to --wheel--.

Signed and Sealed this

Eleventh Day of February, 1992

Attest:

HARRY F. MANBECK, JR.

Attesting Officer

Commissioner of Patents and Trademarks